US011865053B2

(12) United States Patent
Moore et al.

(10) Patent No.: US 11,865,053 B2
(45) Date of Patent: Jan. 9, 2024

(54) WHEELCHAIR APPARATUSES INCLUDING USAGE FEATURES

(71) Applicant: Toyota Motor North America, Inc., Plano, TX (US)

(72) Inventors: Douglas Moore, Fairview, TX (US); Christopher P. Lee, Campbell, CA (US); Melvin Alfredo Dominquez, S. San Francisco, CA (US); Thomas Mitchell Dair, Lafayette, CA (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 17/747,538

(22) Filed: May 18, 2022

(65) Prior Publication Data

US 2022/0273507 A1 Sep. 1, 2022

Related U.S. Application Data

(63) Continuation of application No. 16/926,115, filed on Jul. 10, 2020, now Pat. No. 11,364,162, which is a (Continued)

(51) Int. Cl.

*A61G 5/04* (2013.01)
*A61G 5/12* (2006.01)
*F21V 33/00* (2006.01)

(52) U.S. Cl.

CPC ............... *A61G 5/04* (2013.01); *A61G 5/125* (2016.11); *A61G 2203/20* (2013.01); *F21V 33/0068* (2013.01)

(58) Field of Classification Search

CPC ........ A61G 5/04; A61G 5/125; A61G 5/1059; A61G 5/041; A61G 5/046; A61G 5/063;

(Continued)

(56) References Cited

U.S. PATENT DOCUMENTS 2,681,689 A * 6/1954 Breed .................. A61G 5/1094 280/848
4,428,616 A * 1/1984 Hamilton ................. A61G 5/00 297/145

(Continued)

FOREIGN PATENT DOCUMENTS

CN 201094705 Y 8/2008
CN 201888891 U 7/2011

(Continued)

OTHER PUBLICATIONS

"How to customize a wheelchair" URL: hllps:/lwww.karmanhealthcare.com/how-to-customize-a-wheelchair/ Published/Accessed: May 1, 2018.

(Continued)

*Primary Examiner* — Erez Gurari
(74) *Attorney, Agent, or Firm* — Dinsmore & Shohl LLP

(57) ABSTRACT

A powered wheelchair apparatus includes a chair component, a power base component and a wheelchair control system. The wheelchair control system includes a processor and a user input device communicatively coupled to the processor. A display is communicatively coupled to the processor. A memory module is communicatively coupled to the processor that stores logic that, when executed by the processor, causes the system to receive user instructions from the user input device and display a message on the display based on the user instructions. The display is on a back of the chair component.

16 Claims, 9 Drawing Sheets

Related U.S. Application Data continuation of application No. 16/379,087, filed on Apr. 9, 2019, now Pat. No. 10,744,048.

(60) Provisional application No. 62/654,734, filed on Apr. 9, 2018.

(58) Field of Classification Search
CPC .. A61G 5/1094; A61G 5/128; A61G 2203/20; A61G 2203/16; A61G 2203/14; F21V 33/0068
See application file for complete search history.

(56) References Cited

U.S. PATENT DOCUMENTS

| | | | | |
|---|---|---|---|---|
| 5,180,181 | A * | 1/1993 | Letechipia | A61G 5/10 297/188.05 |
| 5,767,905 | A | 6/1998 | Archambo | |
| 6,145,612 | A | 11/2000 | Dickie | |
| 6,439,281 | B1 | 8/2002 | Hogg | |
| 6,598,947 | B2 | 7/2003 | Hannah | |
| 6,702,314 | B1 * | 3/2004 | Crose | A61G 5/1054 362/459 |
| 7,334,712 | B2 * | 2/2008 | Hassett | A44B 19/262 224/268 |
| 7,581,259 | B2 * | 9/2009 | Thompson | A47G 9/066 2/69.5 |
| 8,132,634 | B1 * | 3/2012 | Flowers | A61G 5/043 180/326 |
| 8,977,431 | B2 | 3/2015 | Peters | |
| 9,649,236 | B1 * | 5/2017 | Wike, Jr. | A61G 5/128 |
| 10,426,675 | B1 * | 10/2019 | Erickson | A61G 5/04 |
| 2003/0052787 | A1 | 3/2003 | Zerhusen | |
| 2005/0090954 | A1 | 4/2005 | Mansell | |
| 2006/0082195 | A1 * | 4/2006 | Jiang | A61G 5/1089 297/68 |
| 2007/0080003 | A1 * | 4/2007 | Koerlin | A61G 5/045 180/907 |
| 2007/0084648 | A1 * | 4/2007 | DuFresne | A61G 5/1059 180/907 |
| 2009/0228164 | A1 * | 9/2009 | Banerjee | A61G 5/045 711/147 |
| 2011/0227314 | A1 * | 9/2011 | Lowenthal | A61G 5/12 297/378.1 |
| 2014/0083225 | A1 * | 3/2014 | Downs | B60K 37/06 74/471 XY |
| 2014/0265238 | A1 * | 9/2014 | Storm | A47C 7/52 280/304.1 |
| 2015/0061258 | A1 | 3/2015 | Flores et al. | |
| 2015/0231002 | A1 * | 8/2015 | Gierse | A61G 5/1075 297/344.17 |
| 2016/0022038 | A1 * | 1/2016 | Cheng | A47C 1/0244 297/354.12 |
| 2016/0067122 | A1 | 3/2016 | Aviv | |
| 2016/0101664 | A1 * | 4/2016 | Richter | A61G 5/1081 701/49 |
| 2016/0270988 | A1 * | 9/2016 | Diaz-Flores | A61G 5/1024 |
| 2016/0330402 | A1 | 11/2016 | Benetti | |
| 2017/0189250 | A1 * | 7/2017 | Juhasz | B60L 15/20 |
| 2017/0266069 | A1 * | 9/2017 | Lozano | A61G 5/04 |
| 2017/0300058 | A1 * | 10/2017 | Peret | A61G 5/061 |
| 2018/0278079 | A1 * | 9/2018 | Maxfield | H02J 7/0049 |
| 2019/0038487 | A1 * | 2/2019 | Cherny | A61G 5/0866 |
| 2019/0049968 | A1 * | 2/2019 | Dean | A61G 5/04 |
| 2019/0049977 | A1 * | 2/2019 | Dean | G05D 1/0225 |
| 2019/0240092 | A1 * | 8/2019 | Huprich | A61G 5/022 |
| 2019/0307619 | A1 * | 10/2019 | Moore | A61G 5/063 |
| 2019/0350780 | A1 * | 11/2019 | Zerhusen | A61G 7/08 |
| 2020/0121526 | A1 * | 4/2020 | Cooper | A61G 5/1075 |
| 2020/0247251 | A1 * | 8/2020 | Ming | B60L 53/38 |
| 2021/0077323 | A1 * | 3/2021 | Lee | A61G 5/1056 |
| 2022/0362414 | A1 * | 11/2022 | Huber | A61G 5/028 |

FOREIGN PATENT DOCUMENTS

| | | | |
|---|---|---|---|
| CN | 201894706 | U | 7/2011 |
| CN | 202223452 | U | 5/2012 |
| CN | 104068975 | A | 10/2014 |
| CN | 106038118 | A | 10/2016 |
| CN | 107595500 | A | 1/2018 |
| GB | 2427674 | A | 1/2007 |
| JP | 2005296082 | A | 10/2005 |
| TW | 1415597 | B | 11/2013 |
| WO | 2007120099 | A1 | 10/2007 |

OTHER PUBLICATIONS

"Wheelchair LED light kit accessories" URL: http://www.customizedmobility.com/product/wheelchair-led-light-kit-accessories/ Published/Accessed: May 3, 2018.
"Magic mobility—Accessory charger" URL: hllps:/lwww.magicmobility.com.au/wheelchairs/wheelchair-options/accessories/ Published/Accessed: May 1, 2018.
"Accessories to customize your wheelchair" URL: hllps://kdsmartchair.com/pages/accessories-customize-wheelchair Published/Accessed: May 1, 2018.
"Personalize your wheelchair with coolhubcaps" URL: http://www.universaldesignstyle.com/personalize-your-wheelchair-with-coolhubcaps/ Published/Accessed: Apr. 17, 2012.
"ALZO wheelchair camera mount" URL: hllps:/lwww.bhphotovideo.com/c/producl/1237147-REG/alzo_ 1145_wheelchair_camera_mount.html.

* cited by examiner

WHEELCHAIR APPARATUSES INCLUDING USAGE FEATURES

CROSS-REFERENCE TO RELATED APPLICATIONS

The present application is a continuation of U.S. patent application Ser. No. 16/926,115 filed on Jul. 10, 2020, which is a continuation of U.S. patent application Ser. No. 16/379,087, filed on Apr. 9, 2019, which claims the benefit of and priority to U.S. Provisional Patent Application No. 62/654,734, filed on Apr. 9, 2018, the entire disclosures of which are hereby incorporated by reference.

TECHNICAL FIELD

The present disclosure generally relates to wheelchair apparatuses and, more specifically, to wheelchair apparatuses that include various usage features.

BACKGROUND

Powered wheelchair apparatuses are known that are used to transport persons from one location to another. Transportation may be the primary operation of the powered wheelchair apparatuses. For some users, the powered wheelchair apparatuses may be an integral part of everyday life. However, powered wheelchair apparatuses are generally standard and have little, if any, personalization that can assist an individual in accomplishing various tasks and can support the individual's pursuit of particular interests.

Accordingly, there is a need for powered wheelchair apparatuses that include usage features that assist the users in daily activities and pursuit of individual interests in addition to providing a mode of transportation.

SUMMARY

In one embodiment, a powered wheelchair apparatus includes a chair component, a power base component and a wheelchair control system. The wheelchair control system includes a processor and a user input device communicatively coupled to the processor. A display is communicatively coupled to the processor. A memory module is communicatively coupled to the processor that stores logic that, when executed by the processor, causes the system to receive user instructions from the user input device and display a message on the display based on the user instructions. The display is on a back of the chair component.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The systems and methods described herein generally relate to powered wheelchair apparatuses that include various usage features that assist users in daily activities and pursuit of individual interests in addition to providing a mode of transportation. The usage features may include, for example, addition of storage locations, lighting features, device charging locations, etc. The various usage features can be integrated into the powered wheelchair apparatuses so as to not interfere with ordinary usage of the powered wheelchair apparatuses, while being integrated into a body structure of the powered wheelchair apparatuses, such as into a seat, armrests, and the like.

Figure 1:
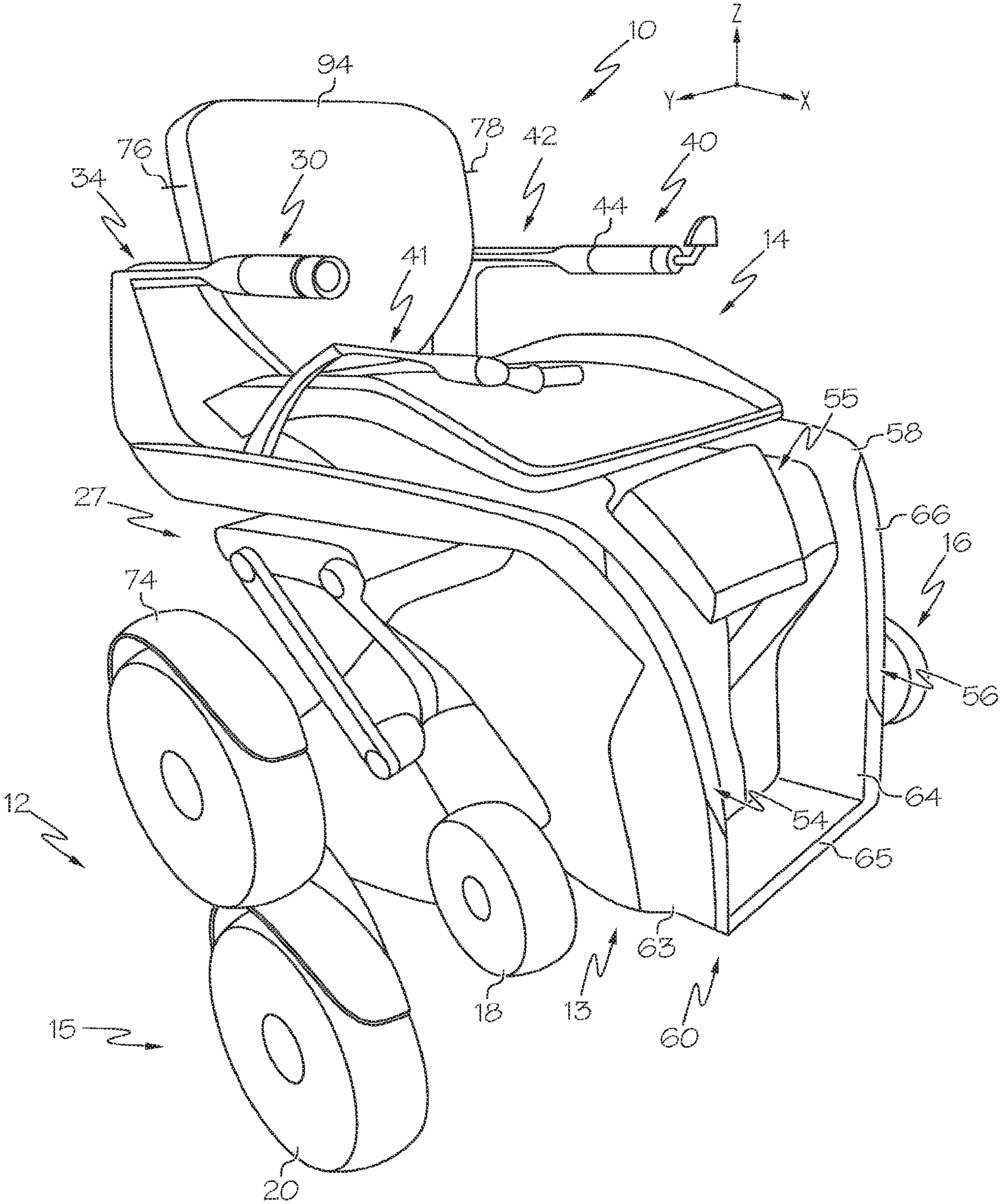
FIG. 1 is a schematic illustration of a wheelchair apparatus, according to one or more embodiments shown and described herein.

As used herein, the term "longitudinal direction" refers to the forward-rearward direction of the wheelchair apparatus (i.e., in a +/−X direction of the coordinate axes depicted in FIG. 1). The term "lateral direction" refers to the cross-direction (i.e., along the y axis of the coordinate axes depicted in FIG. 1), and is transverse to the longitudinal direction. The term "vertical direction" refers to the upward-downward direction of the system (i.e., in the +/−Z-direction of the coordinate axes depicted in FIG. 1). As used herein, "upper" or "top" is defined as generally being towards the positive Z direction of the coordinate axes shown in the drawings. “Lower” or “bottom” is defined as generally being towards the negative Z direction of the coordinate axes shown in the drawings.

Figure 2:
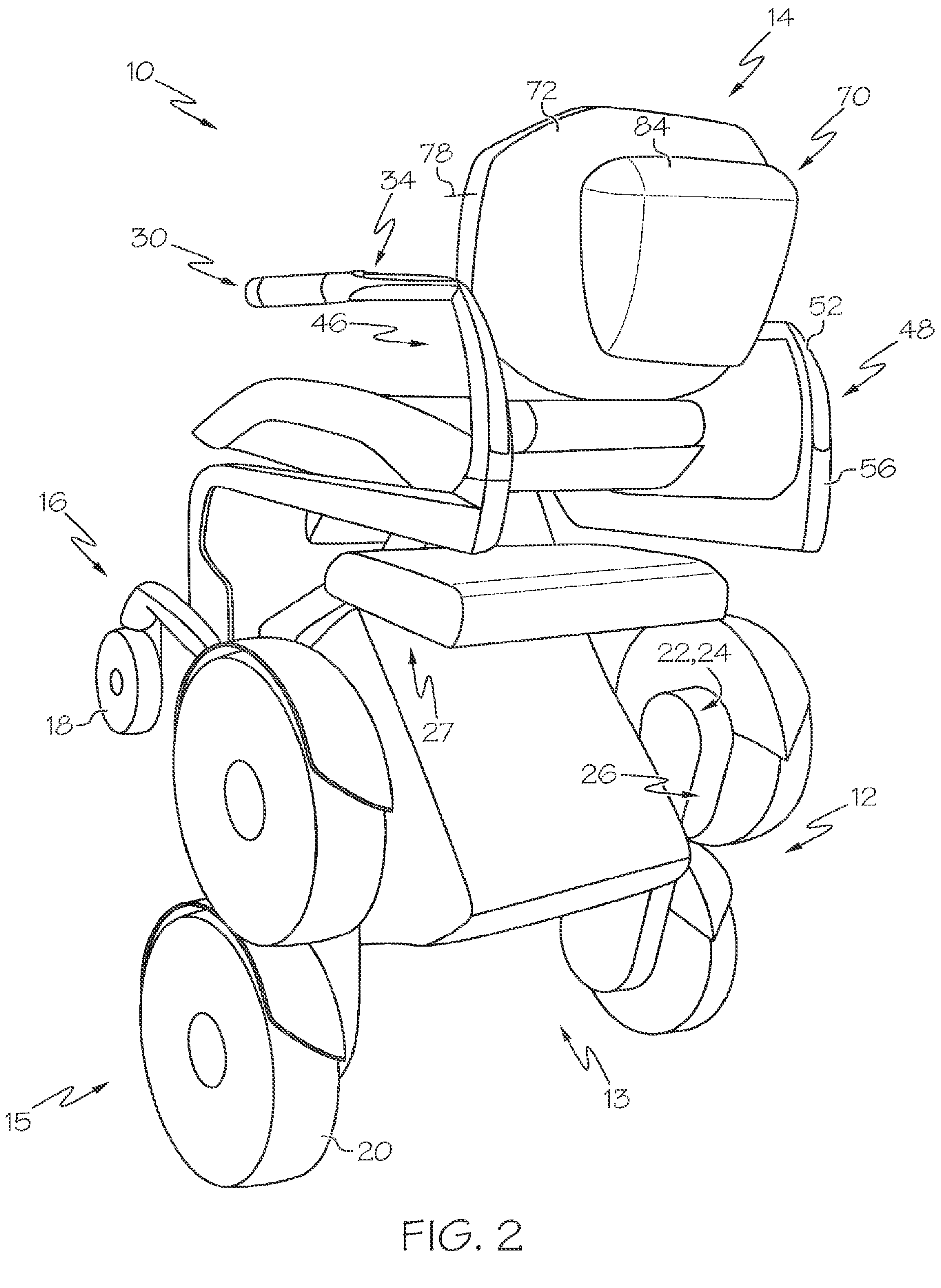
FIG. 2 is another schematic illustration of the wheelchair apparatus of FIG. 1, according to one or more embodiments shown and described herein.

Referring to FIGS. 1 and 2, a wheelchair apparatus 10 generally includes a power base component 12 and a chair component 14. The power base component 12 includes a wheelchair body 13 including a rearward support portion 15 and a forward support portion 16. The power base component 12 may include a plurality unpowered wheels 18, a plurality of powered wheels 20, a battery 22, a motor 24, and a computing device 26. A suspension 27 may be provided for the unpowered wheels 18 that can absorb energy when the unpowered wheels 18 are in use. The computing device 26 may include a memory component. The memory component may store operational and customizing logic. The customizing logic may implement a passenger-specific setting of the wheelchair apparatus 10. Implementing a passenger-specific setting may include determining a current state of a physical property of the wheelchair apparatus 10 to determine whether to implement the passenger-specific setting and/or altering any physical property of the wheelchair apparatus 10. As an example, the passenger-specific settings may be associated with balancing, speed limitations, height, weight distribution, age, skill level, and/or prescriptions of the passenger. The passenger-specific settings may be stored on the computing device 26, a mobile device and/or a remote computing device (e.g., a personal computer).

Figure 3:
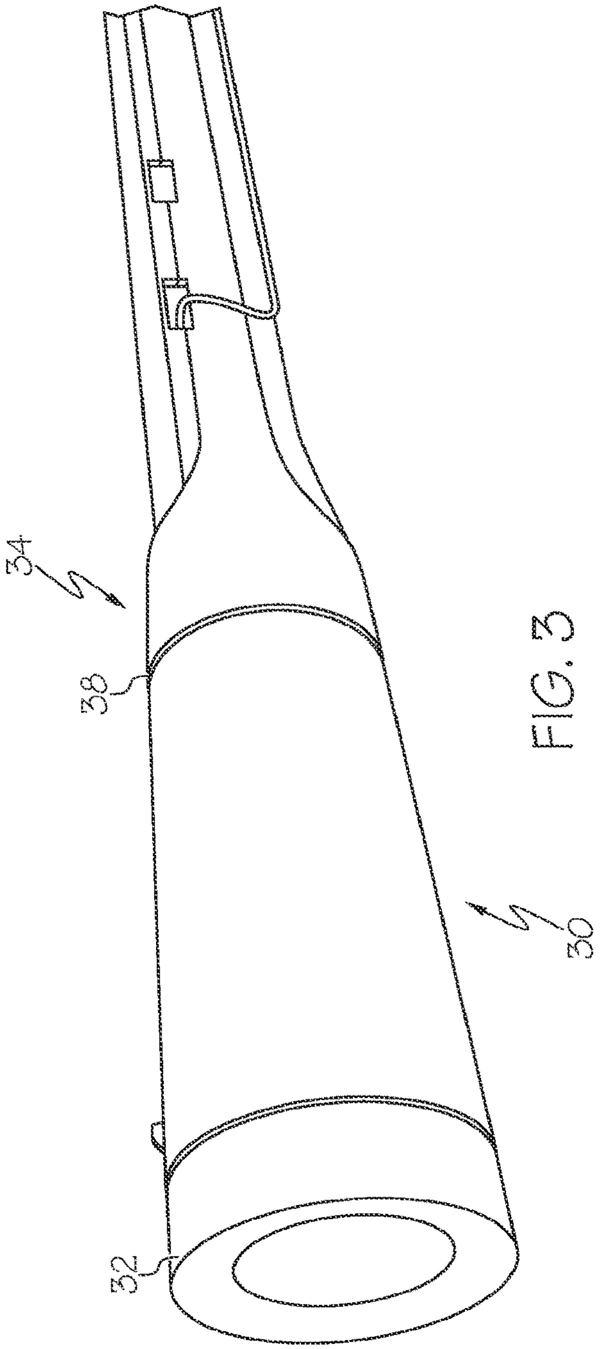
FIG. 3 is a schematic illustration of a user input device for use with the wheelchair apparatus of FIG. 1, according to one or more embodiments shown and described herein.

In the embodiment of FIGS. 1 and 2, the wheelchair apparatus 10 further includes a number of usage features including a chair mode (e.g., a passenger-specific setting) user input device 30 that can be used to change and set various chair modes. Referring to FIG. 3, the user input device 30 may include a knob 32 that can be turned about an axis manually in order to change between the various chair modes. The knob 32 may be located at a distal end 38 of an armrest 34 for ease in accessibility. The chair mode user input device 30 may be, for example, communicatively coupled to the computing device 26 that may have a plurality of chair modes saved in the memory component.

Referring back to FIGS. 1 and 2, a device mount 40 may be carried by an opposite armrest 42. The device mount 40 may be configured to support a portable camera (e.g., such as commercially available from Go Pro, Inc.) or some other suitable device, such as a smart phone, tablet, or other portable computing device. The device mount 40 may also be located at a distal end 44 of the armrest 42 for ease in accessibility and includes device mounting structure (e.g., hooks, clamps, etc.) that can be used effectively mount the device at the distal end 44.

Figure 4:
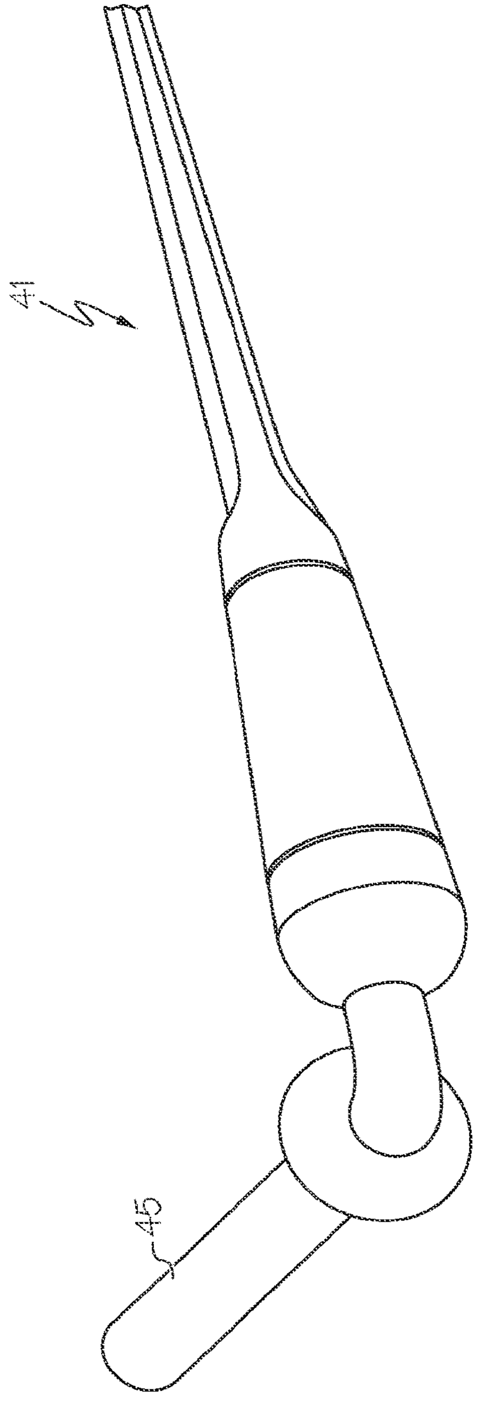
FIG. 4 is a schematic illustration of a control module for use with the wheelchair apparatus of FIG. 1, according to one or more embodiments shown and described herein.

Referring also to FIG. 4, in some embodiments, a control module 41 may be provided that can be used to control a drive unit of the wheelchair apparatus 10. The control module 41 may be collapsible between extended and retracted configurations. The control module 41 may be provided with a motorcycle style hand grip 45 that rotates about a central axis that is used to control speed and direction of the wheelchair apparatus 10.

The wheelchair apparatus 10 includes rear light assemblies 46 and 48 located at rearward facing surfaces 50 of the armrests 34 and 42 (FIG. 2). The rear light assemblies 46 and 48 extend along heights of the rearward facing surfaces 50. The rear light assemblies 46 and 48 include light sources 52, such as light emitting diodes (LEDs) or other suitable light sources for providing lighting at the rearward facing surfaces 50. In some embodiments, light modes of the rear light assemblies 46 and 48 may be controlled by the user, for example, using the user input device 30. The rear light assemblies 46 and 48 may provide lighting function, but may also provide other functions, such as messaging (e.g., Morse code), caution lighting, etc.

The wheelchair apparatus 10 further includes front light assemblies 54 and 56 located at forward facing surfaces 58 of a leg support structure 60 (FIG. 1). In particular, the leg support structure 60 may include opposing leg side protectors 62 and 64 that extend in the vertical direction with a foot support 65 that extends between the leg side protectors 62 and 64. The front light assemblies 54 and 56 extend along heights of the forward facing surfaces 58. As above with the rear light assemblies 46 and 48, the front light assemblies 54 and 56 include light sources 66, such as light emitting diodes (LEDs) or other suitable light sources for providing lighting at the forward facing surfaces 58. In some embodiments, a color provided by the light sources 66 may be different from a color provided by the light sources 52. In some embodiments, light modes of the front light assemblies 54 and 56 may be controlled by the user, for example, using the user input device 30. The front light assemblies 54 and 56 may provide lighting function, but may also provide other functions, such as messaging (e.g., Morse code), caution lighting, etc.

The wheelchair apparatus 10 may include a number of storage locations. For example, a leg storage unit 55 (FIG. 1) may be located at a front of the wheelchair apparatus 10 (such as at a behind the knee location). The leg storage unit 55 may be somewhat rigid, such as like a box with side walls or flexible, such as like a pouch. The leg storage unit 55 may include a lid or may not include a lid and be open at a top providing access to contents of the leg storage unit 55. In some embodiments, the leg storage unit 55 may include a lid that is removable. Further, the leg storage unit 55 may have a removable connection to the wheelchair body 13. Such a removable connection may allow the entire leg storage unit 55 to be removed and transported away from the wheelchair apparatus 10, if desired. In some embodiments, a locking mechanism may be provided for locking the leg storage unit 55 to the wheelchair body 13.

As another example, a back storage unit 70 (FIG. 2) may be located at a rear of the wheelchair apparatus 10 (such as behind back 72). The back storage unit 70 may also be somewhat rigid, such as like a box with side walls or flexible, such as like a pouch. The back storage unit 70 may include a lid or may not include a lid and be open at a top providing access to contents of the back storage unit 70. In some embodiments, the back storage unit 70 may include a lid that is removable. Further, the back storage unit 70 may have a removable connection to the back 72. Such a removable connection may allow the entire back storage unit 70 to be removed and transported away from the wheelchair apparatus 10, if desired. In some embodiments, a locking mechanism may be provided for locking the back storage unit 70 to the back 72.

In some embodiments, opening and closing of the storage units 55 and 70 may be accomplished automatically using a manual lid. In some embodiments, the lids of the storage units 55 and 70 may be moveable automatically, for example, using a motor or other actuation device. The actuation device for the storage units 55 and 70 may be controlled using the computing device 26.

The wheelchair apparatus 10 may include debris guards 74 that may be used to at least partially cover one or more of the wheels 18 and 20. The debris guards 74 may cover only upper portions of the wheels 18 and 20 and are sized and located to inhibit debris, such as dirt, mud, etc. from projecting upward toward the user. The debris guards 74 may be a user-selected color. In some embodiments, the debris guards 74 may be removable and interchangeable with debris guards of different shapes and colors. The wheels 18 and 20 may be formed of any suitable material, such as rubber and may be pneumatic or airless, such as TWEEL tires commercially available from Michelin.

In some embodiments, the wheelchair apparatus 10 may include various hanging features. For example, winglet hanging structures 76 and 78 may extend outwardly from the back 72 of the chair component 14. In the illustrated embodiment, the winglet hanging structures 76 and 78 are projections that extend outwardly from opposite sides of the back 72. A hanging structure 77 (e.g., a hook) may also be provided beneath the chair component 14 or any other suitable location. The back 72 may also include see-through openings 82 or cut-aways that allow for viewing through the back 72, which can facilitate user expression through the back 72 of the chair component 14. Further, the back 72 may have any suitable shape, such as a relatively squared upper end 84 or a tapered upper end 84.

Figure 5:
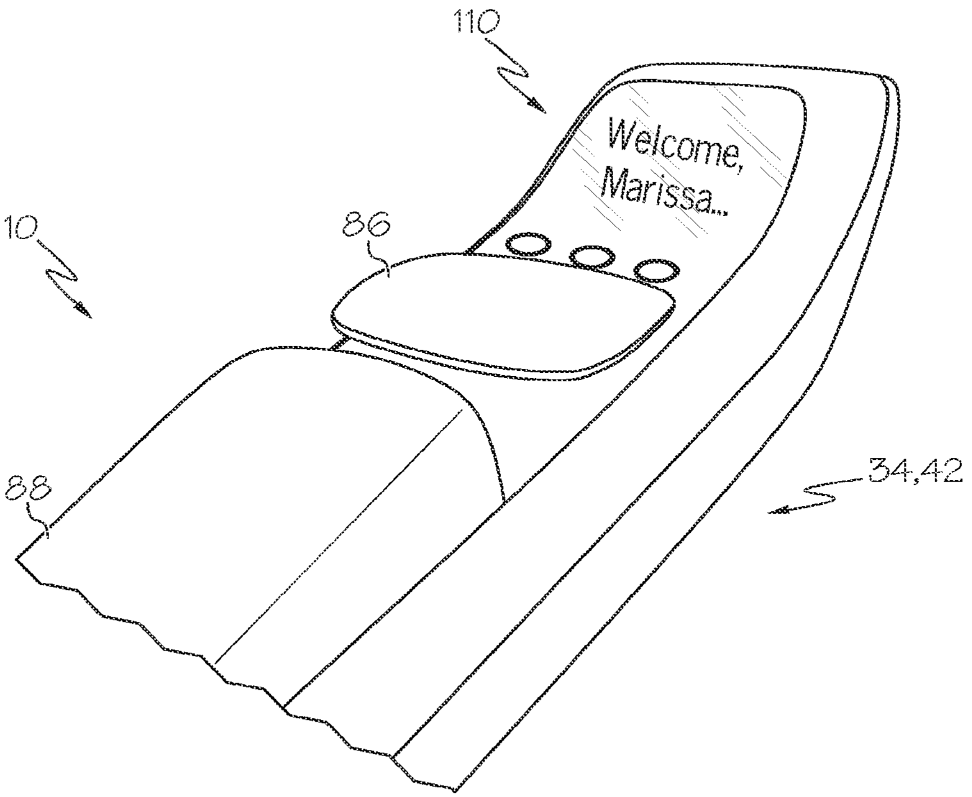
FIG. 5 is a schematic illustration of a display for use with the wheelchair apparatus of FIG. 1, according to one or more embodiments shown and described herein.

Referring to FIG. 5, in some embodiments, a display 110 may be provided on the wheelchair apparatus 10. In this example, the display 110 is provided on one or both of the armrests 34 and 42. As described below, the display 110 may be a touch screen and allow for user input. A control 86 may also be provided that allows for control of movement of the wheelchair apparatus 10. An armrest cushion 88 may provide an increased height of the armrest 34 and 42 for increased arm height when resting thereon.

Figure 6:
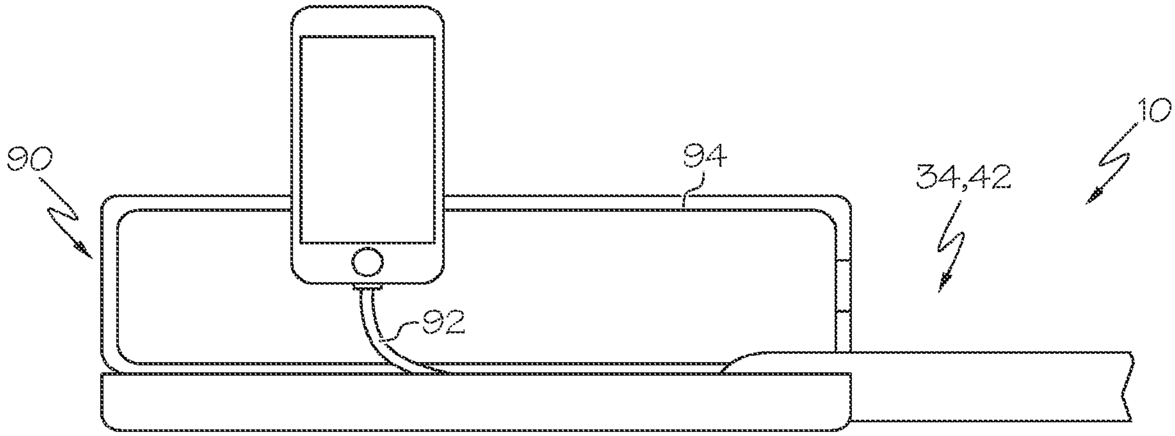
FIG. 6 is a schematic illustration of a device charging compartment for use with the wheelchair apparatus of FIG. 1, according to one or more embodiments shown and described herein.

Referring to FIG. 6, in some embodiments, the wheelchair apparatus 10 may include a device charging compartment 90. The device charging compartment may be provided on one or both of the armrests 34 and 42. The device charging compartment 90 may include a device charging cable 92 (e.g., USB) having any suitable connector or wireless connection suitable for charging a mobile computing device, such as a smart phone. The device charging compartment 90 may or may not have a lid 94.

Figure 7A:
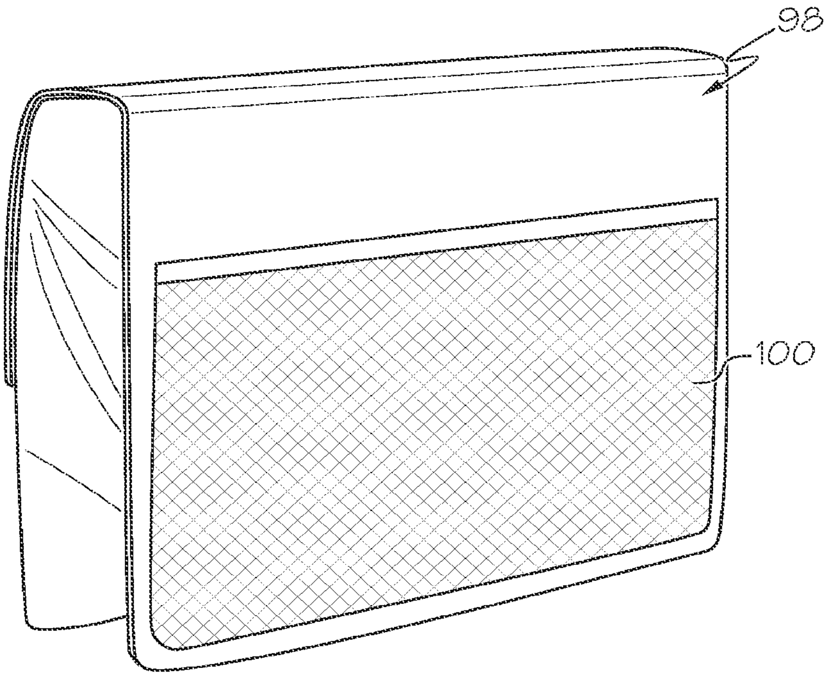
FIG. 7A is a schematic illustration of a flashlight and a storage pouch for use with the wheelchair apparatus of FIG. 1, according to one or more embodiments shown and described herein.
Figure 7B:
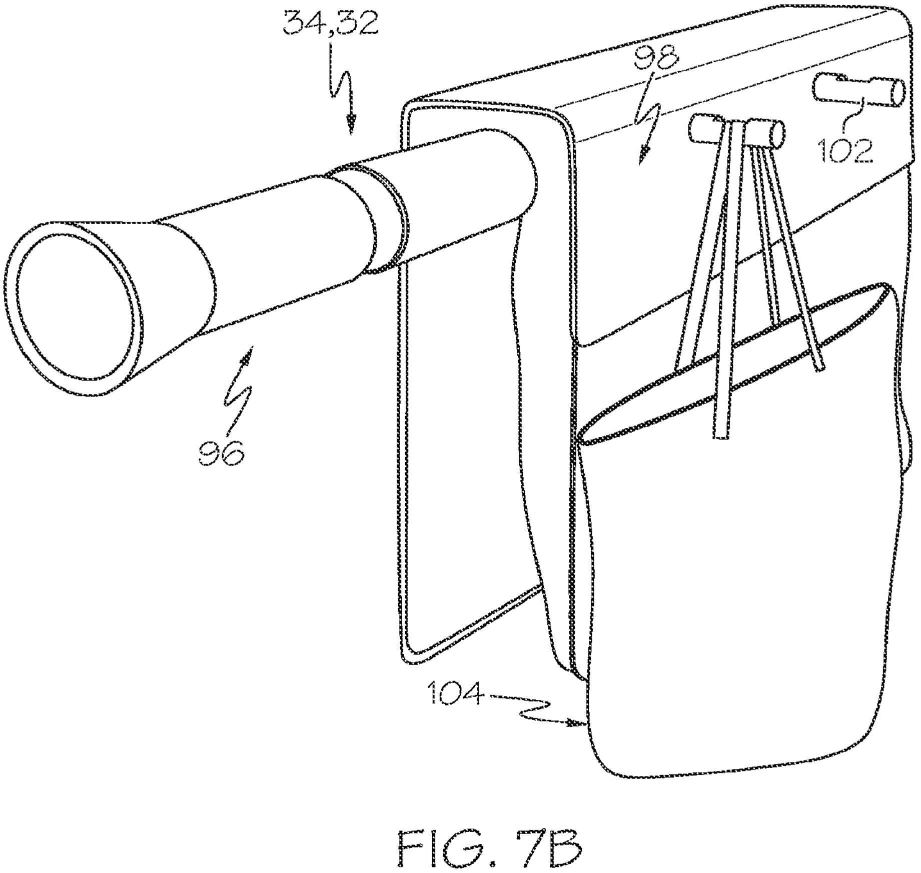
FIG. 7B is a schematic illustration of another storage pouch for use with the wheelchair apparatus of FIG. 1, according to one or more embodiments shown and described herein.

Other exemplary features for inclusion on the wheelchair apparatus 10 are illustrated by FIGS. 7A and 7B. In some embodiments, the wheelchair apparatus 10 may include a flashlight 96. As shown by FIG. 7A, the flashlight 96 may be part or form part of one or both of the armrests 34 and 42 and may be removable therefrom. The flashlight 96 may extend outwardly from the armrest 34, 42 in the longitudinal direction. In some embodiments, the flashlight may be chargeable and configured to charge when connected to the wheelchair apparatus 10. Extending downwardly from the armrest 34, 42 may be a storage pouch 98. The storage pouch 98 may be formed of any suitable material, such as leather and include a see-through material portion 100, such as a mesh, to facilitate identification of items in the pouch only to persons using the wheelchair apparatus 10. Hooks 102 may be provided on an exterior of the storage pouch 98 for hanging bagged items 104.

Figure 8:
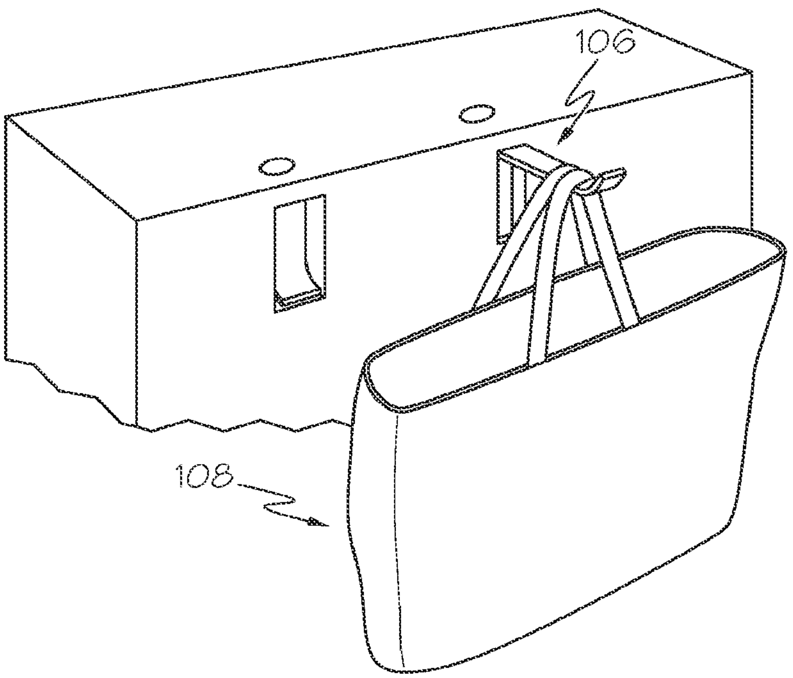
FIG. 8 is a schematic illustration of extendable hooks for use with the wheelchair apparatus of FIG. 1, according to one or more embodiments shown and described herein.

Referring to FIG. 8, some embodiments of the wheelchair apparatus 10 may include extendable hooks 106. The hooks 106 may extend from a stowed configuration to an extended configuration to hold, for example, bagged items 108.

Figure 9:
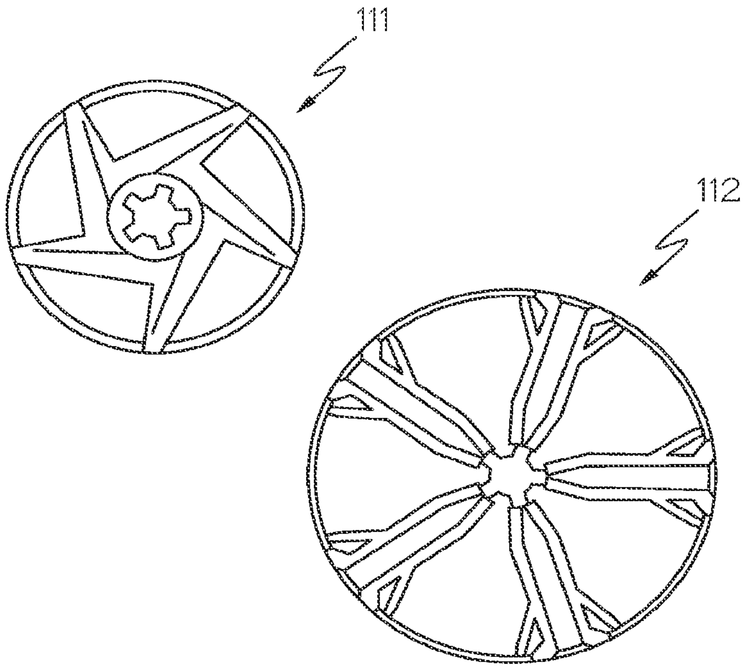
FIG. 9 is a schematic illustration of wheel covers for use with the wheelchair apparatus of FIG. 1, according to one or more embodiments shown and described herein.

Referring to FIG. 9, in some embodiments, the wheelchair apparatus 10 may include the wheels 18 and 20 including custom wheel covers 111 and 112. The wheel covers 111 and 112 may be interchangeable and have different designs and/or colors thereon. Messages may also be provided, such as logos (e.g., sport teams or otherwise).

Figure 10:
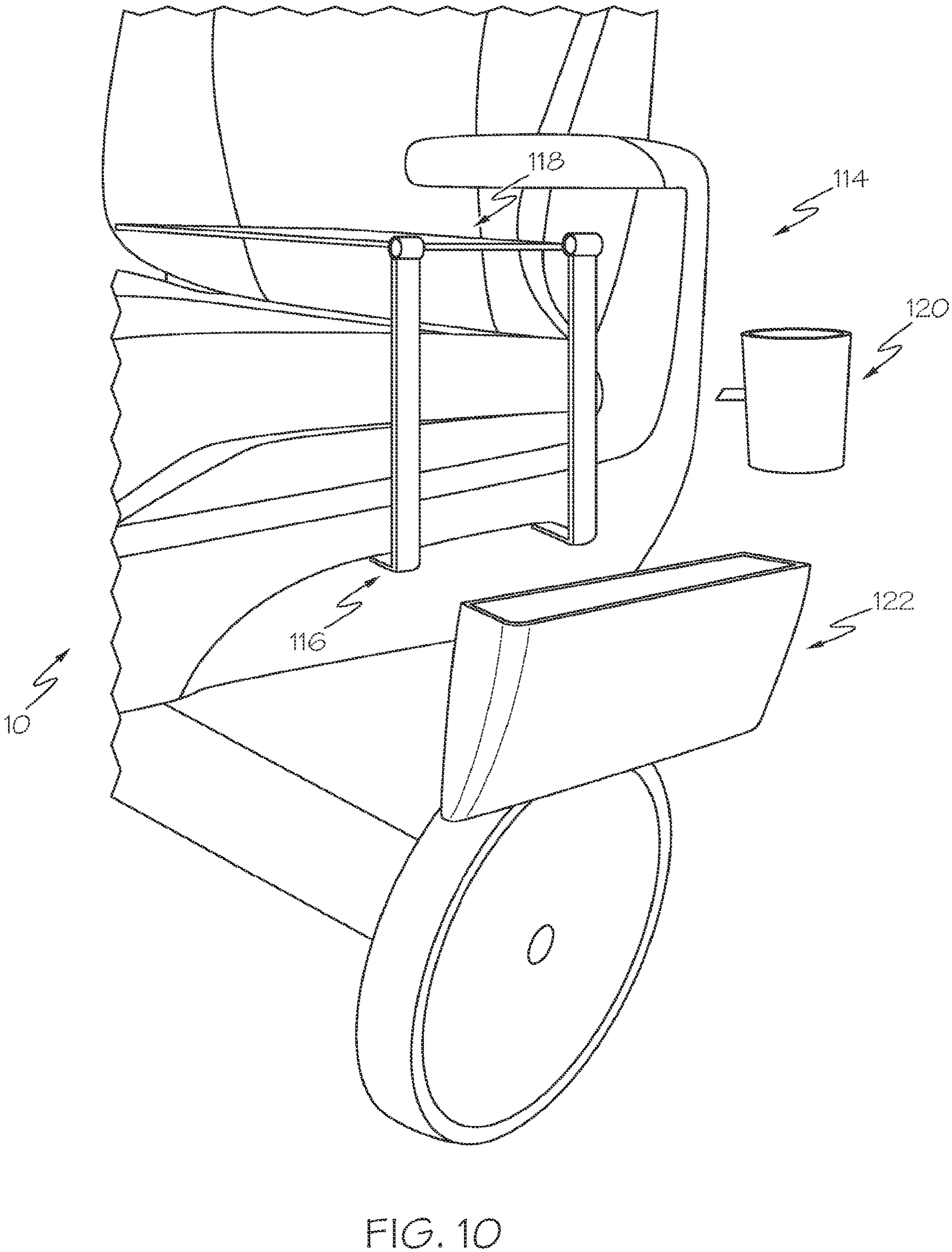
FIG. 10 is a schematic illustration of various interchangeable chair-mounted storage items for use with the wheelchair apparatus of FIG. 1, according to one or more embodiments shown and described herein.

FIG. 10 illustrates another usage feature comprising interchangeable chair-mounted storage items 114. The wheelchair apparatus 10 may include a mounting feature 116 that can be used to mount the storage items 114 directly to the wheelchair apparatus 10. In the illustrated example, the storage items 114 include a shelf assembly 118 and storage containers 120 and 122 of different shapes and sizes.

Figure 11:
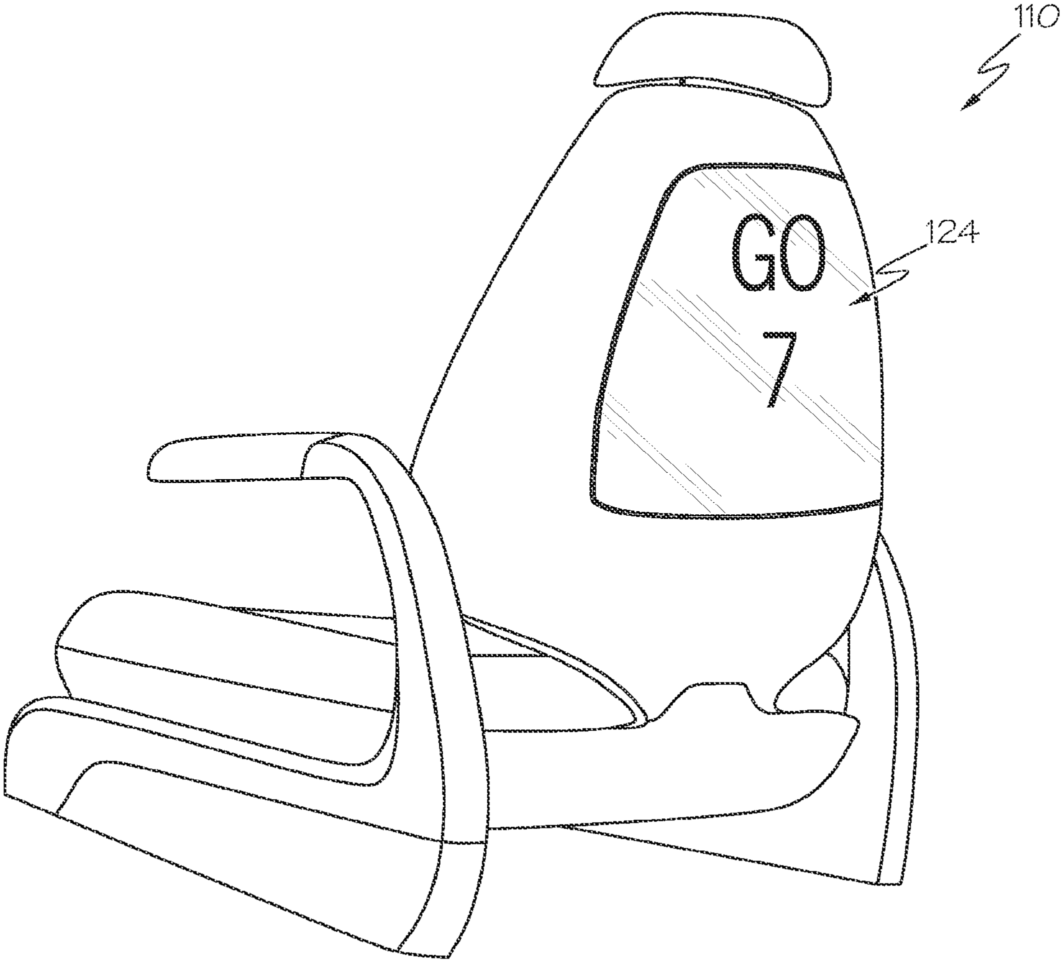
FIG. 11 is a schematic illustration of a rear mounted display for use with the wheelchair apparatus of FIG. 1, according to one or more embodiments shown and described herein.

Referring to FIG. 11, some embodiments of the wheelchair apparatus 10 may include a display 110 located on the rear of the back 72. The display 110 may be, for example, an LED display that can be customized to provide a message 124 or otherwise to provide lighting.

Figure 12:
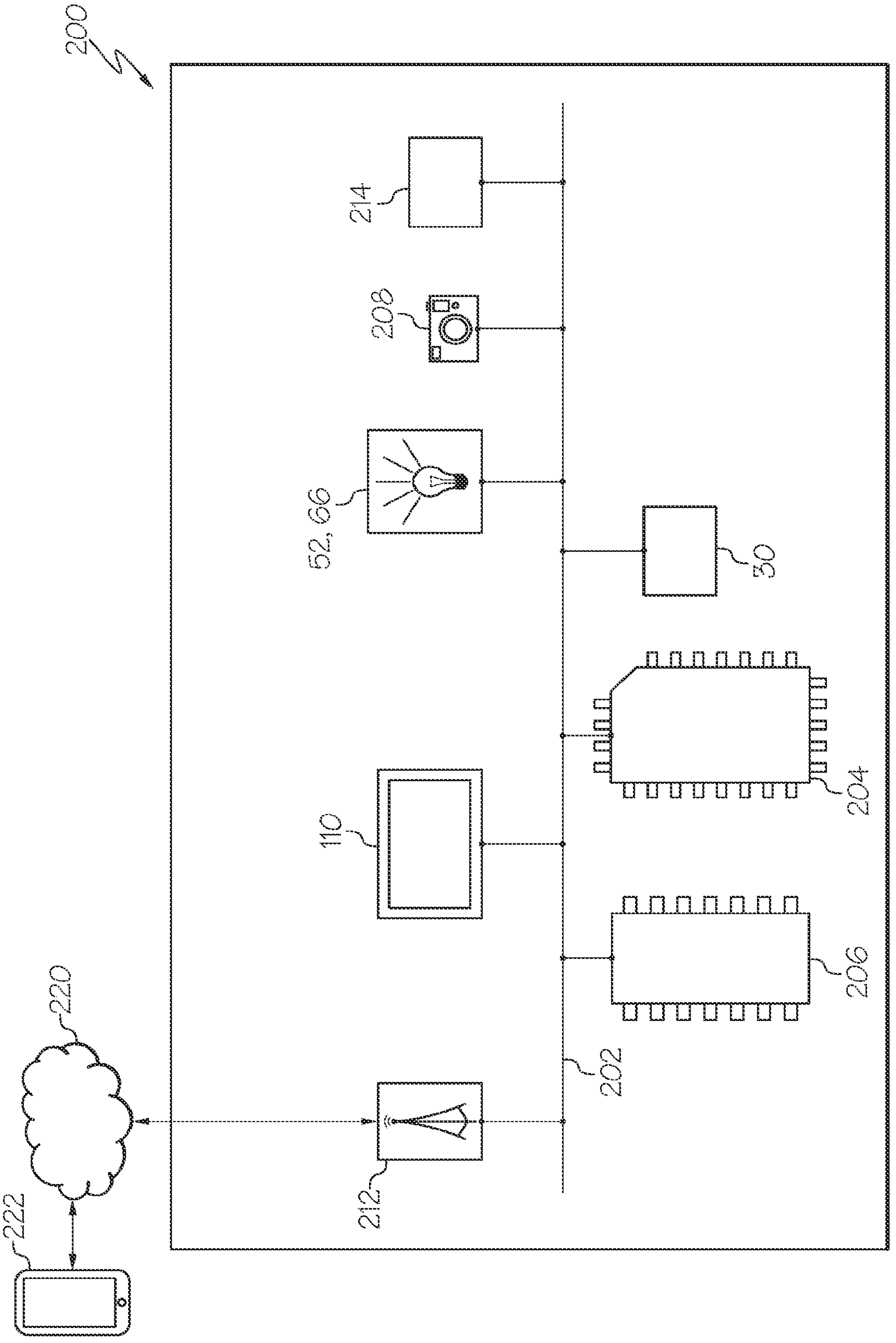
FIG. 12 diagrammatically illustrates a wheelchair control system for use with the wheelchair apparatus of FIG. 1, according to one or more embodiments shown and described herein.

Referring now to FIG. 12, a wheelchair control system 200 of the wheelchair apparatus 10 is illustrated schematically. The wheelchair control system 200 includes a communication path 202, a processor 204, a memory module 206, light sources 52, 66, and the user input device 30. The wheelchair control system 200 may further include a camera 208, the display 110, network interface hardware 212, and a drive mode sensor 214.

The wheelchair control system 200 includes the communication path 202 that provides data interconnectivity between various modules disposed within the wheelchair control system 200. Specifically, each of the modules can operate as a node that may send and/or receive data. In some embodiments, the communication path 202 includes a conductive material that permits the transmission of electrical data signals to processors, memories, sensors, and actuators throughout the wheelchair control system 200. In some embodiments, the communication path 202 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The wheelchair control system 200 includes the processor 204 communicatively coupled with the memory module 206 over the communication path 202. The processor 204 may include any device capable of executing machine-readable instructions stored on a non-transitory computer-readable medium. The processor 204 may include one or more processors. Accordingly, each processor 204 may include a controller, an integrated circuit, a microchip, a computer, and/or any other computing device, such as computing device 26.

The memory module 206 is communicatively coupled to the processor 204 over the communication path 202. The memory module 206 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the wheelchair control system 200 and/or external to the wheelchair control system 200. The memory module 206 may be configured to store one or more pieces of logic, as described in more detail below. The memory module 206 may include one or more memory modules. The embodiments described herein may utilize a distributed computing arrangement to perform any portion of the logic described herein.

Embodiments of the present disclosure include logic stored on the memory module 206 that includes machine-readable instructions and/or an algorithm written in any programming language of any generation (e.g., 1 GL, 2 GL, 3 GL, 4 GL, and/or 5 GL) such as, machine language that may be directly executed by the processor 204, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As noted above, the wheelchair control system 200 utilizes the light sources 52, 66. The light sources 52, 66 may be part of the light assemblies 46, 48, 54, 56 described above. The light sources 52, 66 may include a plurality of light sources. The light sources 52, 66 may be coupled to the communication path 202 and communicatively coupled to the processor 204. The light sources 52, 66 may be any device capable of outputting light, such as but not limited to an LED, an incandescent light, a fluorescent light, and/or the like.

The wheelchair control system 200 includes the user input device 30 coupled to the communication path 202 such that the communication path 202 communicatively couples the user input device 30 to other modules of the wheelchair control system 200. As described above, the user input device 30 may be controlled manually. In some embodiments, there may be multiple user input devices. The user input device 30 may be any device capable of transforming mechanical, optical, or electrical signals into a data signal capable of being transmitted with the communication path 202. Specifically, the user input device 30 may include any number of movable objects that transform physical motion into a data signal that can be transmitted over the communication path 202 such as, for example, a button, a switch, a knob, a microphone or the like. In some embodiments, the display 110 and the user input device 30 are combined as a single module and operate as a touchscreen user input device. However, it is noted, that the display 110 and the user input device 30 may be separate from one another. In some embodiments, there may not be a display. The user input device 30 may allow a user to control operation of the wheelchair apparatus 10.

In some embodiments, the wheelchair control system 200 further includes network interface hardware 212 for communicatively coupling the wheelchair control system 200 with a network 220. The network interface hardware 212 can be communicatively coupled to the communication path 202 and can be any device capable of transmitting and/or receiving data via the network 220. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth wireless communication protocol. In another embodiment, network interface hardware 212 may include a Bluetooth send/receive module for sending and receiving Bluetooth communications to/from a mobile device 222.

The wheelchair control system 200 may communicate, through the network interface hardware 212, with the network 220 to communicatively couple the wheelchair control system 200 with the mobile device 222. In one embodiment, the network 220 is a personal area network that utilizes Bluetooth technology to communicatively couple the wheelchair control system 200 and the mobile device 222. In other embodiments, the network 220 may include one or more computer networks (e.g., a personal area network, a local area network, or a wide area network), cellular networks, satellite networks and/or a global positioning system and combinations thereof. Accordingly, the wheelchair control system 200 can be communicatively coupled to the network 220 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In some embodiments, the mobile device 222 may be included as a user input device. The mobile device 222 may include a processor and a memory module. The processor can execute logic to communicate with the wheelchair control system 200 in order to facilitate sending instructions to the wheelchair control system 200 from the mobile device 222 to control the wheelchair apparatus 10. The mobile device 222 may be configured with wired and/or wireless communication functionality for communicating with the wheelchair control system 200. In embodiments described herein, the mobile device 222 may include mobile phones, smartphones, personal digital assistants, dedicated mobile media players, mobile personal computers, laptop computers, and/or any other mobile devices capable of being communicatively coupled with the wheelchair control system 200. It is noted, that in this embodiment, the wheelchair control system 200 may communicate with the mobile device 222 even while the mobile device 222 is remote from the wheelchair apparatus 10. In this way, the wheelchair apparatus 10 may be controlled with the mobile device 222 remotely from outside of the wheelchair apparatus 10.

The wheelchair control system 200 may further include the display 110 for providing visual output such as, for example, maps, navigation, entertainment, information, image data from the camera 208, or a combination thereof. The display 110 is coupled to the communication path 202. Accordingly, the communication path 202 communicatively couples the display 110 to other modules of the wheelchair control system 200. The display 110 may include any medium capable of transmitting an optical output such as, for example, a cathode ray tube, light emitting diodes, a liquid crystal display, a plasma display, or the like. Moreover, the display 110 may be a touchscreen that, in addition to providing optical information, detects the presence and location of a tactile input upon a surface of or adjacent to the display 110. Accordingly, the display 110 may receive mechanical input directly upon the optical output provided by the display 110. As such, the display 110 may be included as a user input device. Additionally, it is noted that the display 110 can include a processor and a memory module.

The wheelchair control system 200 may further include the camera 208 coupled to the communication path 202 such that the communication path 202 communicatively couples the camera 208 to other modules of the wheelchair control system 200. The camera 208 may include any devices having an array of sensing devices (e.g., pixels) capable of capturing image data from an environment of the wheelchair apparatus 10. The camera 208 may have any resolution. As noted above, image data received from the camera 208 may be displayed on the display 110. In some embodiments, the wheelchair control system 200 may activate the camera 208 upon receiving instructions from the user input device 30.

The wheelchair control system 200 may further include a drive mode sensor 230 communicatively coupled over the communication path 202 to other wheelchair modules. The drive mode sensor 230 may be configured to detect a particular driving mode of the wheelchair apparatus 10. For example, the drive mode sensor 230 may detect whether the wheelchair apparatus 10 is stopped and output a driving mode signal regarding the same. The wheelchair control system 200, based on the driving mode of the wheelchair apparatus 10 (e.g., forward, reverse, etc.), may execute logic to control operation of various wheelchair modules. For example, the wheelchair control system 200 may only allow operation of features with the wheelchair apparatus 10 stopped.

The above-described wheelchair apparatuses provide various usage features that, alone or combined, assist users in daily activities and pursuit of individual interests in addition to providing a mode of transportation. The usage features may be incorporated into features of the wheelchair apparatuses to minimize disruption of ordinary usage of the wheelchair apparatuses. The usage features are easily accessible when needed for particular tasks. Any one or many of the usage features described herein may be provided alone or in combination on a particular wheelchair apparatus.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A powered wheelchair apparatus comprising:

a chair component;

a power base component; and a wheelchair control system comprising:

a processor;

a user input device communicatively coupled to the processor, the user input device extending outwardly from a distal end of an armrest of the chair component in a longitudinal direction, the user input device comprising a control knob that is manually actuated and turns about a longitudinal axis;

a memory module communicatively coupled to the processor that stores logic that, when executed by the processor, causes the wheelchair control system to:

receive user instructions from the user input device; and change operation of the powered wheelchair apparatus from one mode to a different mode based on the instructions from the user input device.

2. The powered wheelchair apparatus of claim 1, wherein the wheelchair control system comprises a display communicatively coupled to the processor, the memory module storing logic that, when executed by the processor, causes the wheelchair control system to change operation of the display based on movement of the user input device.

3. The powered wheelchair apparatus of claim 2, wherein the display is on a back of the chair component.

4. The powered wheelchair apparatus of claim 1, wherein the power base component comprises a light assembly communicatively coupled to the processor.

5. The powered wheelchair assembly of claim 4, wherein the memory module storing logic that, when executed by the processor, causes the wheelchair control system to change operation of the light assembly based on movement of the user input device.

6. The powered wheelchair apparatus of claim 1 further comprising a leg storage unit connected to the power base component at a knee location.

7. The powered wheelchair apparatus of claim 1 further comprising a back storage unit located at a rear of the chair component.

8. The powered wheelchair apparatus of claim 1, wherein the powered base component comprises a wheel and a debris guard that partially surrounds the wheel.

9. The powered wheelchair apparatus of claim 1, wherein the chair component comprises a winglet hanging structure that extends laterally outward from a side of a back of the chair component.

10. The powered wheelchair apparatus of claim 1, wherein the chair component comprises the armrest and a display located on the armrest.

11. The powered wheelchair apparatus of claim 1, wherein the chair component comprises the armrest and a device charging compartment located on the armrest.

12. The powered wheelchair apparatus of claim 1, wherein the chair component comprises another armrest and a flashlight that is releasably attached to the armrest.

13. The powered wheelchair apparatus of claim 12, wherein the flashlight extends outwardly from a distal end of the another armrest in a longitudinal direction.

14. The powered wheelchair of claim 1, wherein the base component comprises a wheel comprising a removable wheel cover.

15. A method of controlling a powered wheelchair apparatus, the method comprising:

manually actuating a control of a user input device that is communicatively coupled to a processor of a wheelchair control system, the user input device extending outwardly from a distal end of an armrest of the chair component in a longitudinal direction and comprising a control knob that is manually actuated and turns about a longitudinal axis; and the wheelchair control system changing operation of the powered wheelchair apparatus from one mode to a different mode based on instructions from the user input device.

16. The method of claim 15, wherein the wheelchair control system comprises a display communicatively coupled to the processor, the method further comprising changing operation of the display based on movement of the user input device.

* * * * *